(12) United States Patent
Bourget et al.

(10) Patent No.: US 6,798,958 B2
(45) Date of Patent: Sep. 28, 2004

(54) CABLE WITH A HIGH DENSITY OF OPTICAL FIBERS

(75) Inventors: Vincent Bourget, Marly le Roi (FR); Jean-Marc Kaczmarek, Calais (FR)

(73) Assignee: Alcatel, Paris (FR)

( * ) Notice: Subject to any disclaimer, the term of this patent is extended or adjusted under 35 U.S.C. 154(b) by 183 days.

(21) Appl. No.: 10/245,299

(22) Filed: Sep. 18, 2002

(65) Prior Publication Data

US 2003/0053771 A1 Mar. 20, 2003

(30) Foreign Application Priority Data

Sep. 20, 2001 (FR) .............................................. 01 12158

(51) Int. Cl.[7] .................................................. G02B 6/44
(52) U.S. Cl. ........................ 385/113; 385/109; 385/111
(58) Field of Search ................................ 385/109, 111, 385/113

(56) References Cited

U.S. PATENT DOCUMENTS

| 4,606,604 A | * | 8/1986 | Soodak ........................ 385/113 |
| 4,850,672 A | | 7/1989 | Zimmermann |
| 4,952,012 A | * | 8/1990 | Stamnitz ....................... 385/101 |
| 5,751,879 A | | 5/1998 | Graham et al. |
| 6,621,965 B2 | * | 9/2003 | Seddon et al. ................ 385/111 |
| 2002/0159726 A1 | * | 10/2002 | Brown et al. ................. 385/109 |

FOREIGN PATENT DOCUMENTS

WO          WO 00/72071 A1     11/2000

OTHER PUBLICATIONS

Patent Abstracts of Japan, vol. 1998, No. 11, Sep. 30, 1998 & JP 10 170784 A (Hitachi Cable Ltd.), Jun. 26, 1998.

* cited by examiner

Primary Examiner—John D. Lee
Assistant Examiner—Tina M Lin
(74) Attorney, Agent, or Firm—Sughrue Mion, PLLC

(57) ABSTRACT

A cable includes a tubular jacket which surrounds a plurality of protection tubes in which optical fibers are accommodated in groups and have a relative freedom of movement. These tubes are disposed in layers in which they are disposed in a helix. The cable includes at least one layer made up of an assembly of tubes which have an outside diameter smaller than that of the tubes of a layer that they surround and the tubes of the two layers all contain the same number of optical fibers.

5 Claims, 1 Drawing Sheet

CABLE WITH A HIGH DENSITY OF OPTICAL FIBERS

CROSS-REFERENCE TO RELATED APPLICATIONS

This application is based on French Patent Application No. 01 12 158 filed Sep. 20, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to an optical fiber cable with a high density of fibers, of the type which includes a tubular jacket surrounding a plurality of protection tubes in which groups of optical fibers are housed. It relates more particularly to a cable comprising a large number of fibers, in which the fiber protection tubes are disposed in layers and helically within each layer.

2. Description of the Prior Art

Optical fiber cables of the type referred to above conventionally include protection tubes for groups of optical fibers, the tubes having a cross section slightly larger than would be sufficient to accommodate the fibers of a group so that the fibers have some freedom of movement within the tubes in the event of deformation of the cable. This is known in the art. Combined with winding the tubes in a helix, this limits the longitudinal forces, and in particular the traction or compression forces, to which the optical fibers of a cable are subjected when the cable is spooled, unwound from a spool and/or bent, for example when spooling it for storage or when installing it. These operations must be carried out without exceeding predetermined mechanical limits for a cable with given specifications, because of the fragile nature of the fibers. This is also known in the art.

Thus research into optical fiber cables is currently being undertaken with a view to obtaining the greatest possible density of fibers in each cable to meet present and future demand for optical transmission of information using fibers as the physical transmission medium, whilst conforming to the mechanical constraints imposed by use of such fibers in the cable, especially during installation. The cables are ordinarily installed in conduits, underground or in a technical tunnel. One field of research aims to increase the number of fibers for the same outside diameter of the cable and/or to reduce the diameter of a cable accommodating a given number of fibers.

SUMMARY OF THE INVENTION

The invention therefore proposes an optical fiber cable including a tubular jacket which surrounds a plurality of protection tubes disposed in layers and in a helix within each layer, wherein the optical fibers are accommodated and have a relative freedom of movement.

According to one feature of the invention the cable includes at least one layer made up of an assembly of tubes which have an outside diameter smaller than that of the tubes of a layer that they surround, although the tubes of the two layers each contain the same number of optical fibers, to increase the capacity of the cable and/or to limit its outside diameter relative to a cable having layers in which the tubes have the same outside diameter.

According to the invention the cable includes at least one layer made up of an assembly of tubes having an outside diameter smaller than that of the tubes of the layer that they surround, the ratios between the inside diameter and the helical winding pitch for these layers being chosen to obtain an equivalent freedom of movement for the fibers regardless of the layer.

According to the invention the same ratio between the inside diameter and the outside diameter of the protector tubes is chosen for the tubes of the various layers.

In one embodiment of the invention, for use when the cable includes fibers having different sensitivities to any significant deformation, said fibers are distributed between the layers according to their sensitivity, the tubes containing the more sensitive fibers forming one or more layers surrounded by at least one layer in which the tubes contain less sensitive fibers.

In a different embodiment of the invention the tubes containing the fibers are assembled in a regular manner to form contiguous layers between the sheathing and a central bearing member around which the layers are placed. The layer adjoining the bearing member is made up of tubes having the same outside diameter at least equal to that of the tubes of the other layers, the layer adjoining the inside wall of the tube that forms the sheathing is made up of tubes having the same outside diameter smaller than that of the tubes of at least the layer adjoining the bearing member, and the respective numbers of tubes in the various layers are chosen to increase from the layer adjoining the bearing member to the layer adjoining the inside wall of the tube that forms the sheathing so that each layer is virtually continuous.

The invention, its features and its advantages are explained in the following description with reference to the figures mentioned below.

DETAILED DESCRIPTION OF THE PREFERRED EMBODIMENT

Figure 1:
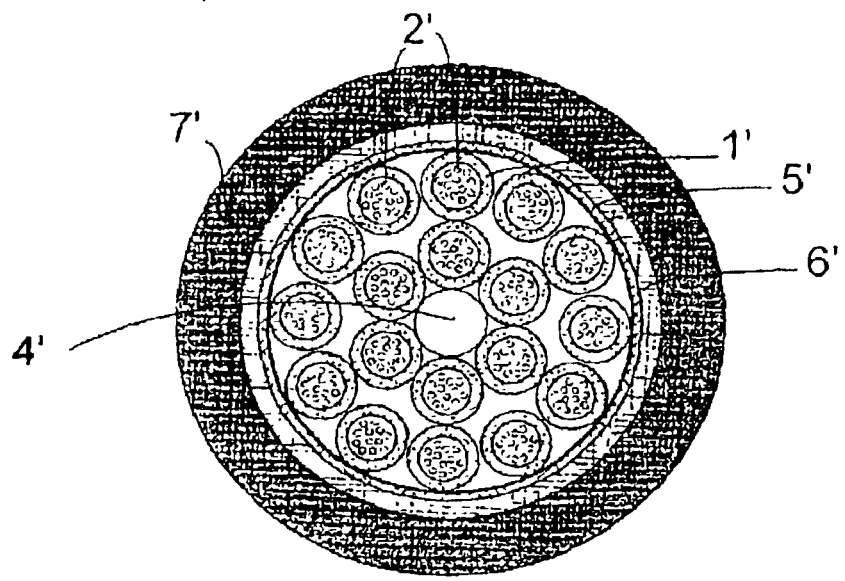
FIG. 1 is a view in cross section of a prior art optical fiber cable.
Figure 2:
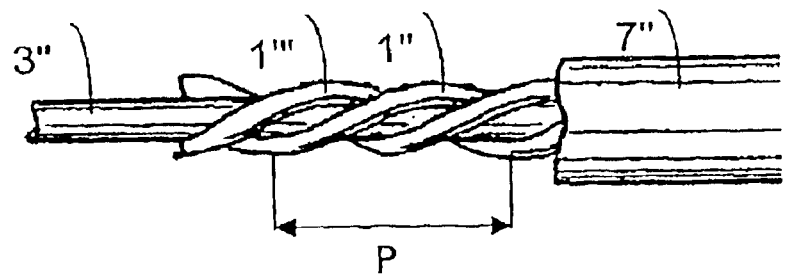
FIG. 2 shows a detail of one partly stripped end of a prior art optical fiber cable.

The prior art optical fiber cable, a cross section of which is shown in FIG. 1, includes a one-piece or composite tubular jacket surrounding a plurality of protection tubes 1' housing groups of the same number of optical fibers 2', for example twelve fibers per group. The fibers 2' in a group have relative freedom of movement within the tube 1' in which they extend side-by-side, for the reason mentioned above. The function of the tubes 1' is to protect the fibers from radial and longitudinal forces to which the optical fiber cable may be subjected, and they are conventionally disposed in concentric layers and in a helix with a constant or alternating winding pitch, there being two such layers in the example shown. The tubes usually have the same diameter if they all contain the same number of fibers; their outside diameter is 2.5 mm, for example, in the case of tubes receiving twelve glass optical fibers. The same helical winding pitch P is conventionally adopted for the protection tubes of one layer, as shown in FIG. 2 for a theoretical cable example comprising a layer of tubes including two representative tubes 1" and 1'". The tubes are wound with a helical winding pitch P around a central bearing member 3" of the cable and inside a protective tubular jacket 7".

The cable shown in FIG. 1 includes mechanical strength members to prevent the application of excessive forces to the fibers, in particular traction or bending forces when installing the cable. This is known in the art.

In the example shown in FIG. 1, the cable includes a bearing member 4' which is more particularly intended to withstand longitudinal forces applied to the cable. A strength structure 6' is included in the jacket, in which it is situated between a sealing tape wrapping 5', inside which are housed the bearing member 4' and the protection tubes 1' provided for the optical fibers 2', and an external protection sheath 7'.

Figure 3:
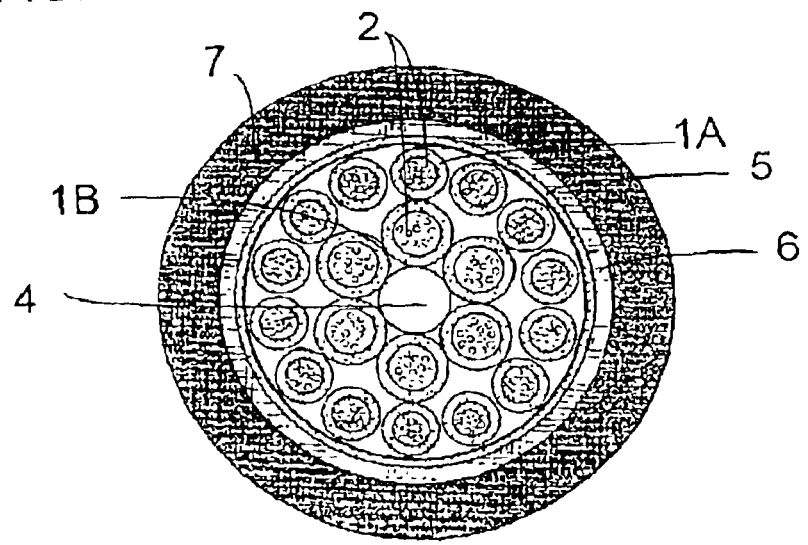
FIG. 3 is a view in cross section of an optical fiber cable according to the invention.

The above kind of cable jacket—combining a central bearing member 4 and an assembly including a strength structure 6, a sealing tape wrapping 5 and an external protection sheath 7—is also shown in FIG. 3, which relates to a cable according to the invention. This architecture is shown by way of example only and must not be considered as limiting on the invention.

The tubular cable jacket shown in FIG. 3 and comprising the components 5, 6 and 7 can be manufactured in various ways and take various forms. The bearing member 4 can be made from a resin reinforced with glass fibers, from metal, or from any other appropriate material. The strength structure 6 can take the force of carbon fiber wicks, for example. The sealing tape wrapping 5 surrounds the tubes in which are housed the optical fibers 2 of the cable and separates these tubes from the strength structure 6. The external protection sheath 7 is made from a material that can be extruded, for example, such as a fluorinated resin, a polyolefin, a compound, etc.

According to the invention, there are two or more layers of tubes around the bearing member 4 and inside the sealing tape wrapping 5, as shown diagrammatically by way of example in FIG. 3.

The tubes in the layers preferably all house the same number of optical fibers 2. According to the invention, at least one layer is made up of an assembly of tubes which all have an outside diameter smaller than that of the tubes of the layer that they surround, such as the tubes of the layer including the tube 1A relative to the tubes of the layer including the tube 1B.

In the embodiment shown, the tubes of the inner layer including the tube 1B have an outside diameter of 2.5 mm, for example, whereas the tubes of the outer layer including the tube 1A have an outside diameter of 2 mm. If, as shown, the six tubes of the inner layer of the cable shown in FIG. 1 and the six tubes of the inner layer of the cable shown in FIG. 3 have the same outside diameter and contain the same number of fibers, it is possible to dispose a greater number of tubes on the outside layer of the cable shown in FIG. 3 than on that of the cable shown in FIG. 1. This increase corresponds to adding two tubes each containing twelve fibers to the outer layer of the example shown, which implies reducing the inside diameter of the tubes of the outer layer relative to that of the inner layer. The diameter of the external envelope of the outer layer, which in practical terms corresponds to the inside face of the sealing tape wrapping 5, can therefore be reduced in the manner shown in FIG. 3. Here this reduction is associated with an increase in the density of the optical fiber cable and thus of its transmission capacity. It can also be exploited to reduce the outside diameter of the cable, or to be more precise of its external protection sheath 7, compared to that of a prior art cable of the kind shown in FIG. 1. Retaining the same cable outside diameter and including a greater number of tubes and thus of optical fibers in the various layers can of course be envisaged.

In one particular embodiment of the invention the tubes in the various layers, such as the tubes 1A and 1B, are manufactured with the same ratio between their inside diameter and their outside diameter (it must be borne in mind that the tubes in a layer have the same outside diameter and therefore the same inside diameter). The fact that the tubes of one layer, enveloped within another layer, can have a larger inside diameter than the tubes of said other layer is therefore reflected in a reduction in the freedom of movement of the fibers contained in the tubes of the surrounding layer relative to that obtained for the fibers contained in the tubes of the surrounded layer, if the fibers have the same outside diameter in all the tubes. To compensate this reduction in the freedom of movement of the fibers contained in the tubes of a surrounding layer relative to that obtained for the fibers contained in the smaller inside diameter tubes of an surrounded layer, a helical winding pitch P is therefore used for the tubes of the surrounding layer that is at least the same as, and preferably greater than, for those of the surrounded layer. The respective winding pitches are determined in a manner that is known to the person skilled in the art as a function of the characteristics of the layers of tubes so that an equivalent freedom of movement is obtained for the optical fibers in the various layers of tubes in the cable.

In another particular embodiment of the invention, cables can be produced which include optical fibers which have different sensitivities to any deformation to which they may be subjected, in particular when unwinding the cable from a spool and installing it. Such deformation can in particular be caused by unwinding the cable from a spool and installing it, especially when installing it involves inserting it into a conduit or into a technical tunnel that exists already or covering the cable. The deformation that occurs under the above conditions is known, as a general rule, to be more difficult to control than those to which the cable is subjected during spooling, at the end of the manufacturing process.

The invention therefore distributes the fibers between the layers as a function of their respective sensitivity, the more sensitive fibers being housed in the tubes of at least one layer which is surrounded by at least one other layer of tubes containing less sensitive fibers and thus better able to withstand forces transmitted to the cable, in particular when the cable is bent in a localized manner.

The cable shown in FIG. 3 includes protection tubes, such as the tubes 1A and 1B, which are assembled in a regular manner to form contiguous layers between the sheathing and a bearing member 4. Two layers are shown here, it being understood that this number can be increased, as already indicated. The layer adjoining the bearing member 4 is made up of tubes, such as the tube 1B, having the same outside diameter, for example 2.5 mm, which is at least equal to that of the tubes of the other layer or layers. The layer adjoining the inside wall of the sheathing tube, thus in this example the inside face of the sealing tape wrapping 5, is made up of tubes having the same external diameter, for example 2 mm, which is smaller than that of the tubes of at least the layer adjoining the bearing member 4. The number of tubes for each layer is chosen so that the layer is continuous or virtually continuous. The inside diameters of the tubes and the pitch for simple or alternating helical winding of the tubes in layers are such that the optical fibers have practically the same freedom of movement regardless of the layer in which they are situated.

There is claimed:

1. An optical fiber cable including a tubular jacket which surrounds a plurality of protection tubes disposed in layers and in a helix within each layer, wherein said optical fibers are accommodated in groups in which they have relative freedom of movement, which cable includes at least one layer made up of an assembly of tubes which have an outside diameter smaller than that of said tubes of a layer that they surround and said tubes of said two layers all contain the same number of optical fibers.

2. The optical fiber cable claimed in claim 1 wherein said cable includes at least one layer made up of an assembly of tubes having an outside diameter smaller than that of said tubes of the layer that they surround, the ratios between the inside diameter and the winding pitch of said tubes for these layers being chosen to obtain an equivalent freedom of movement for said fibers regardless of the layer.

3. The optical fiber cable claimed in claim 2 wherein the same ratio between the inside diameter and the outside diameter of said protector tubes is chosen for said tubes of the various layers.

4. The optical fiber cable claimed in claim 1, which includes fibers which are distributed between said layers according to their sensitivity, the tubes containing the more sensitive fibers forming one or more layers surrounded by at least one layer in which the tubes contain less sensitive fibers.

5. The optical fiber cable claimed in claim 1, wherein said tubes containing said fibers are assembled in a regular manner to form contiguous layers between the sheathing and a central bearing member around which said layers are placed, the layer adjoining said bearing member is made up of tubes having the same outside diameter at least equal to that of said tubes of the other layers, the layer adjoining the inside wall of the tube that forms said sheathing is made up of tubes having the same outside diameter smaller than that of the tubes of at least said layer adjoining said bearing member, and the respective numbers of tubes in the various layers are chosen to increase from said layer adjoining said bearing member to said layer adjoining said inside wall of said tube that forms said sheathing so that each layer is continuous or virtually continuous.

* * * * *